June 16, 1931.   R. B. WEBSTER ET AL   1,810,453
CHEWING GUM CONFECTION
Filed July 1, 1929
Fig.1.
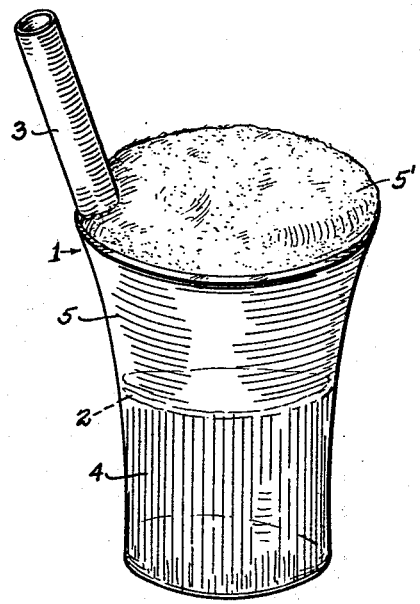
Fig.2.
Fig.3.
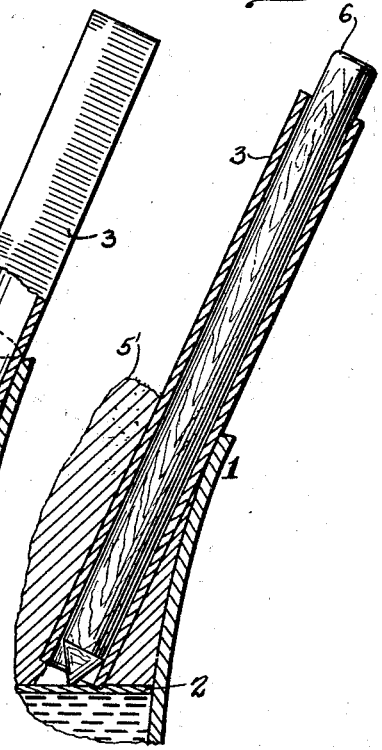
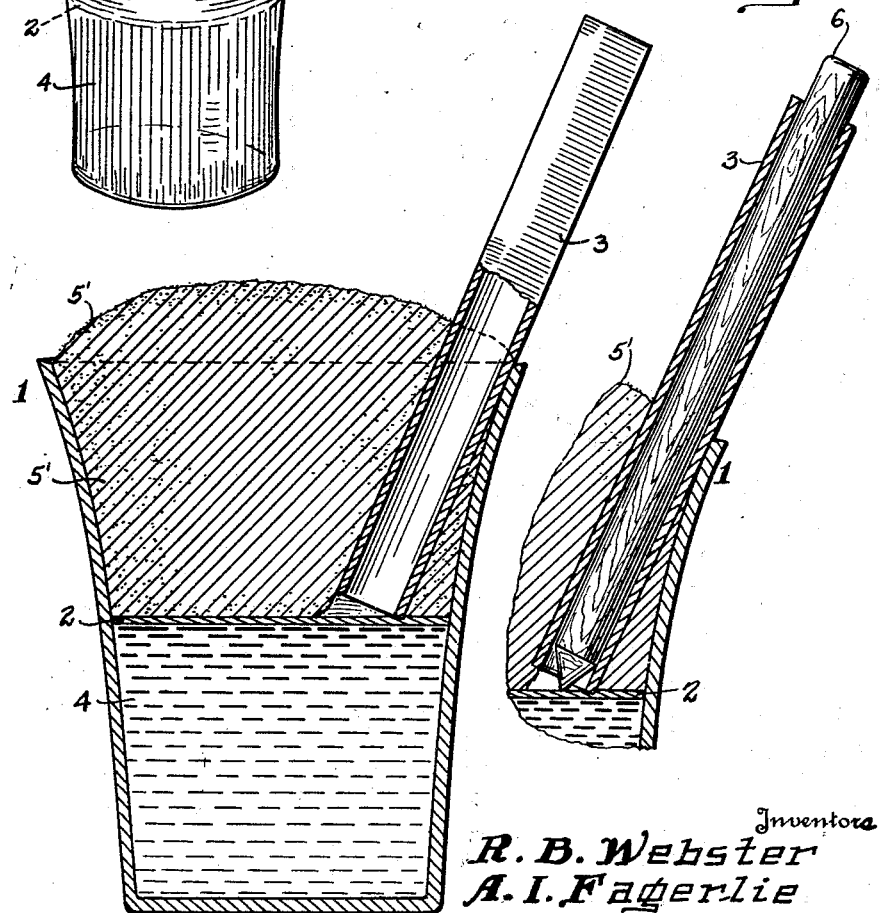
Inventors
R. B. Webster
A. I. Fagerlie
and I. C. Barager
By Mason Fenwick Lawrence
Attorneys Patented June 16, 1931

1,810,453

UNITED STATES PATENT OFFICE

RAYMOND B. WEBSTER, ALFRED I. FAGERLIE, AND IRVING C. BARAGER, OF EAU CLAIRE, WISCONSIN

CHEWING GUM CONFECTION

Application filed July 1, 1929. Serial No. 375,275.

This invention relates to a novelty confection in the form of a container made of chewing wax or gum and preferably in the shape of a glass and provided with a horizontal partition also made of chewing wax or gum and of a thickness to enable the same to be readily punctured, said partition forming a closed container for a syrup or other sweetened liquid and an open receptacle above to contain a marshmallow or other filler and a tube or hollow straw arranged with the container and extending into the filler; the whole representing a container filled with material in imitation of a glass of soda water or a sundae.

In the accompanying drawings:

Figure 1 is a perspective view of a candy chewing gum or confection novelty embodying our invention.

Figure 2 is a vertical section through the same.

Figure 3 shows a modified form of the tube device.

The object of this invention is the production of a confection novelty in imitation of a glass of soda water or a sundae composed of a container made of a chewing gum or wax and containing an edible syrup and filler, which after said edible material is consumed will leave a piece of chewing gum or wax.

In the drawings, 1 represents a container made preferably in the shape of a glass and composed of a chewing wax or gum. This container is formed with a horizontal partition, 2, also made of chewing gum or wax and of such a thickness as to enable it to be readily pierced by a tube or straw, 3, carried by the container. The partition, 2, forms a sealed chamber, 4, beneath the same, which latter is provided with a suitable flavoring syrup. Above the partition, 2, is an open chamber, 5, which is filled with marshmallow, 5', or other suitable filler in imitation of ice cream. The straw or tube, 3, is inserted into the marshmallow filler, the latter being of such a consistency as to hold the straw in position, as shown in the drawings. The syrup will generally be of a contrasting color to the marshmallow filler to indicate a particular fruit flavor, such as strawberry, orange, lemon and the like, while the marshmallow filler will generally be white to represent a foam or vanilla ice cream, but of course may be colored to represent chocolate ice cream, orange ice or the like.

A confection novelty of this kind is designed to be sold to children at a low price, say one cent, and being made attractively and of high grade materials, has proven fascinating to children and affords them a great deal of pleasure without in any way injuring their health.

By sealing the fruit syrup within the container, the syrup is prevented from leaking out and the child or other person manipulating the confection is enabled to pretend to be eating an ice cream soda or sundae and after consuming the marshmallow filler which is designed to represent ice cream, the child or other person can puncture the partition and get access to the fruit syrup and when that is consumed, he will have a piece of wax or gum remaining which will be flavored and sweetened and constitute a piece of chewing gum or wax which can be enjoyed for a considerable length of time.

The tube 3 may be provided with a closely fitting solid pointed stick 6, slightly longer than the tube, which could be forced through the partition 2 to puncture the same and then withdrawn to permit the fruit syrup to be sucked from the compartment 4 through said tube.

Having described our invention, what we claim as new and desire to secure by Letters Patent is:

1. As an improved article of manufacture a chewing gum confection made in the form of a drinking glass, open at top and closed at its bottom and provided with a thin imperforated horizontal partition, also made of chewing gum or wax, forming a lower sealed chamber and an upper open ended chamber; the lower chamber carrying a suitable flavoring syrup or juice and the upper chamber carrying a suitable confection filler made to represent ice cream, and a tube or straw inserted into and carried by the upper chamber and designed to pierce the partition for the withdrawal of the syrup from the lower chamber, the whole representing a glass of soda water or an ice cream sundae substantially as described.

2. As an improved article of manufacture, a chewing gum confection made in the form of a drinking glass or tumbler, open at the top and closed at its bottom, and provided with a thin imperforated horizontal partition, also made of chewing gum or wax, forming a lower sealed chamber and an upper open ended chamber; the lower chamber carrying a suitable flavoring syrup or juice and the upper chamber carrying a suitable confection filler made to represent ice cream, and a tube or straw inserted into and carried by the upper chamber and provided with a solid penetrating stick designed to pierce the partition to permit the syrup to be sucked through the tube upon the withdrawal of the stick; the whole representing a glass of soda water or an ice cream sundae substantially as described.

In testimony whereof we affix our signatures.

RAYMOND B. WEBSTER.
ALFRED I. FAGERLIE.
IRVING C. BARAGER.